US008538722B2

(12) United States Patent
Naya

(10) Patent No.: US 8,538,722 B2
(45) Date of Patent: Sep. 17, 2013

(54) FEATURE TRANSFORMATION APPARATUS AND FEATURE TRANSFORMATION METHOD

(75) Inventor: Futoshi Naya, Nara (JP)

(73) Assignee: Empire Technology Development LLC, Wilmington, DE (US)

(*) Notice: Subject to any disclaimer, the term of this patent is extended or adjusted under 35 U.S.C. 154(b) by 100 days.

(21) Appl. No.: 12/855,908

(22) Filed: Aug. 13, 2010

(65) Prior Publication Data

US 2011/0213582 A1 Sep. 1, 2011

(30) Foreign Application Priority Data

Feb. 26, 2010 (JP) ................................. 2010-043430

(51) Int. Cl.
G01P 15/00 (2006.01)
(52) U.S. Cl.
USPC ............ 702/141; 702/152; 702/154; 600/595
(58) Field of Classification Search
USPC .................. 455/41, 66, 33.2, 422, 410, 426, 455/444; 370/331, 328, 338, 329, 465, 251; 702/94, 141, 151–154, 193; 600/595
See application file for complete search history.

(56) References Cited

U.S. PATENT DOCUMENTS

| 7,146,636 | B2* | 12/2006 | Crosbie | 726/7 |
| 8,113,843 | B2* | 2/2012 | Naya | 434/257 |
| 2003/0036350 | A1* | 2/2003 | Jonsson et al. | 455/41 |
| 2007/0135225 | A1* | 6/2007 | Nieminen et al. | 473/212 |
| 2010/0305480 | A1* | 12/2010 | Fu et al. | 600/595 |

FOREIGN PATENT DOCUMENTS

| JP | 2008-307207 | 12/2008 |
| JP | 2008307207 A | * 12/2008 |
| JP | 2009-032033 | 2/2009 |

OTHER PUBLICATIONS

Ling Bao, Activity Recognition from User-Annotated Acceleration Data, 2004, Springer-Verlag Berlin Heidelberg.*
Duy Tam Gilles Huynh, Human Activity Recognition with Wearable Sensors, 2008, Technische Universität Darmstadt.*
Seiichi Uchida, Logical DP matching for detecting similar subsequence, 2007, ACCV'07 Proceedings, Springer-Verlag Berlin, Heidelberg.*
Machine translation of JP 2008-307207.*
Seiichi Uchida, Logical DP matching for detecting similar subsequence, ACCV'07 Proceedings, Springer-Verlag Berlin Heidelberg 2007.*

(Continued)

Primary Examiner — Sujoy Kundu
Assistant Examiner — Harun Chowdhury
(74) Attorney, Agent, or Firm — Maschoff Brennan

(57) ABSTRACT

A feature transformation apparatus recognizes activities of subjects in adaptation to each individual and improves recognition accuracy. The feature transformation apparatus includes a section that acquires respective prescribed activity data of one or more reference individuals and a subject when the one or more reference individuals and the subject perform a prescribed activity. A section extracts a reference individual feature of the one or more reference individuals and a subject feature of the subject. A calculation section calculates at least one standard feature based on the one or more reference individual features. A transform matrix between the standard feature and the subject feature is calculated. Recognition object activity data is acquired when the subject performs a recognition object activity. A recognition object feature of the subject is extracted from the recognition object activity data. The recognition object feature is transformed using the transform matrix.

19 Claims, 6 Drawing Sheets

(56) References Cited

OTHER PUBLICATIONS

Susanna Pirttikangas, Feature Selection and Activity Recognition from Wearable Sensors, Springer-Verlag Berlin Heidelberg 2006.*

Duy Tam Gilles Huynh, Human Activity Recognition with Wearable Sensors, Darmstadt, 2008.*

Pirttikiangas, S. et al., "Feature Selection and Activity Recognition from Wearable Sensors," Lecture Notes in Computer Science, vol. 4329, pp. 516-527, 2006.

Naya, F. et al., "Workers' Routine Activity Recognition using Body Movements and location Information," 10th IEEE International Symposium on Wearable Computers, pp. 105-108, Oct. 11-14, 2006.

Leggetter, C.J. and Woodland, P.C., "Flexible Speaker Adaptation Using Maximum likelihood linear Regression," In Proc. ARPA Spoken language Technology Workshop, pp. 110-115, 1995.

Ling Bao, et al "Activity Recognition from user-Annotated Acceleration Data" In Second International Conference on Pervasive Computing, pp. 1-17, 2004.

Vassilios V. Digalakis, et al "Speaker Adaptation Using Combined Transformation and Bayesian Methods" IEEE Transactions on Speech and Audio Processing, vol. 4, No. 4, Jul. 1996, pp. 294-300.

JPO; Office Action in related foreign application (JP 2010-043430) to which priority is claimed by the present application; May 31, 2010.

* cited by examiner

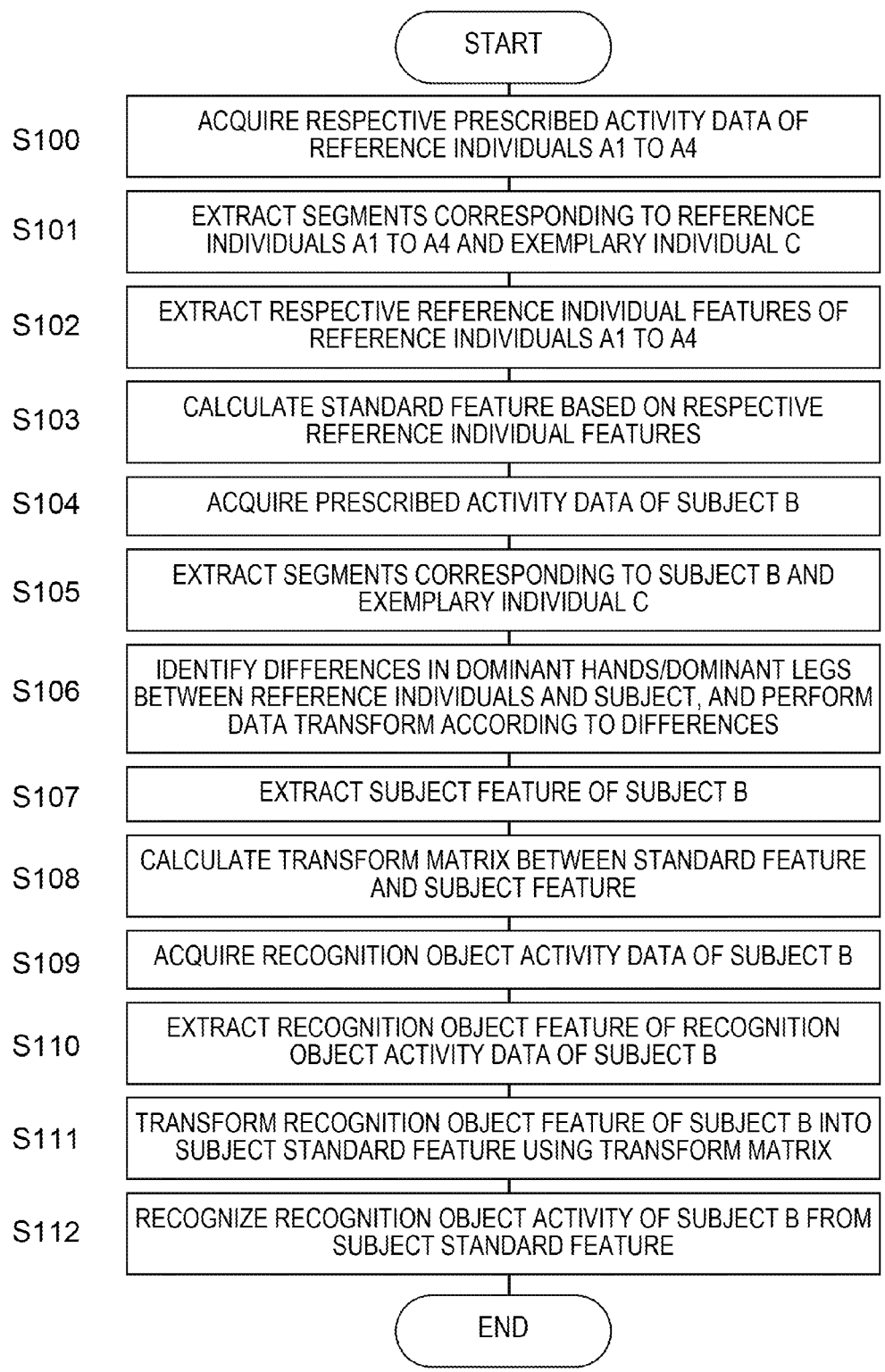

FEATURE TRANSFORMATION APPARATUS AND FEATURE TRANSFORMATION METHOD

CROSS-REFERENCE TO RELATED APPLICATIONS

This application claims priority to Japanese Patent Application No. 2010-043430, filed Feb. 26, 2010, which is incorporated herein by reference.

TECHNICAL FIELD

The present disclosure relates to a feature transformation apparatus and a feature transformation method.

BACKGROUND

Activity recognition techniques are generally known in which a motion measurement apparatus such as an acceleration sensor or a gyro-sensor is mounted on a human body to measure and recognize activities of a subject (for example, refer to Ling Bao, Stephen S. Intille, "Activity Recognition from User-Annotated Acceleration Data", In Second International Conference on Pervasive Computing, pp. 1-17, 2004).

However, while conventional activity recognition techniques extract features corresponding to activities of a subject from sensor data (activity data) measured by and obtained from a motion measurement apparatus to recognize activities of the subject, the techniques are not designed to recognize activities in adaptation to each individual and problematically result in a decline in recognition accuracy.

More specifically, even when the same activity is performed by two different individuals, differences in physique such as gender and age, individual differences such as dominant hands and dominant legs, and differences such as deviations in sensor mounting positions or the like generally result in activity data that differs between the individuals and, consequently, different features extracted from such activity data. In a learning stage, since a recognition instrument must be created so as be capable of recognizing such different activity data and features as the same activity, the accuracy of the recognition instrument is relatively low. In addition, in a recognition stage, the possibility of an erroneous recognition made on a target individual having a different physique from a subject during learning is relatively high.

SUMMARY

A feature transformation apparatus according to the present disclosure includes a prescribed activity data acquisition section configured to acquire respective prescribed activity data of one or more reference individuals and a subject when the one or more reference individuals and the subject perform a prescribed activity. A first feature extraction section is configured to extract a reference individual feature of the prescribed activity data of the one or more reference individuals and a subject feature of the prescribed activity data of the subject from the respective prescribed activity data. A calculation section is configured to calculate at least one standard feature based on the one or more reference individual features. A transform matrix calculation section is configured to calculate a transform matrix between the calculated standard feature and the subject feature. A recognition object activity data acquisition section is configured to acquire recognition object activity data when the subject performs a recognition object activity. A second feature extraction section is configured to extract a recognition object feature of the recognition object activity data of the subject from the recognition object activity data of the subject. A transformation section is configured to transform the recognition object feature of the recognition object activity data using the transform matrix.

In addition, with the feature transformation apparatus according to the present disclosure, when there are a plurality of the reference individuals and the standard feature calculation section is configured to calculate a plurality of the standard features, the transform matrix calculation section is capable of respectively calculating difference values between the respective standard features and the subject feature and calculating a transform matrix between the single standard feature whose calculated difference value is the smallest and the subject feature.

Furthermore, the feature transformation apparatus according to the present disclosure can also include a recognition section configured to recognize a recognition object activity of the subject from the recognition object feature transformed by the transformation section.

Moreover, the feature transformation apparatus according to the present disclosure can also include a corresponding segment extraction section configured to extract corresponding segments of respective prescribed activity data of the one or more reference individuals and the subject using respective prescribed activity data of the one or more reference individuals and the subject, wherein the transform matrix calculation section is also capable of calculating a transform matrix between the standard feature and the subject feature based on information on the extracted corresponding segments.

A feature transformation method according to the present disclosure is a feature transformation method to be executed by an information processing apparatus having a control unit and a storage unit. The feature transformation method includes the control unit acquiring respective prescribed activity data of one or more reference individuals and a subject when the one or more reference individuals and the subject perform a prescribed activity and storing the respective prescribed activity data in the storage unit. The control unit reads out respective prescribed activity data stored in the storage unit. The control unit extracts reference individual features of the prescribed activity data of the one or more reference individuals and a subject feature of the prescribed activity data of the subject from the respective read-out prescribed activity data. The control unit calculates at least one standard feature based on the one or more reference individual features. The control unit calculates a transform matrix between the calculated standard feature and the subject feature and stores the transform matrix in the storage unit. The control unit acquires recognition object activity data when the subject performs a recognition object activity and stores the recognition object activity data in the storage unit. The control unit reads out the recognition object activity data of the subject stored in the storage unit and extracts a recognition object feature of the recognition object activity data of the subject from the read-out recognition object activity data. The control unit reads out the transform matrix stored in the storage unit and transforms the recognition object feature of the recognition object activity data using the read-out transform matrix.

BRIEF DESCRIPTION OF THE FIGURES

FIG. 2 is a diagram illustrating an example in which a motion measurement apparatus according to the embodiment is mounted on a subject or the like.

FIG. 6 is an example of a flow chart of a feature transformation method of the feature transformation apparatus according to the embodiment.

DETAILED DESCRIPTION

Hereinafter, embodiments for implementing the present disclosure will be described with reference to the drawings.

Figure 1:
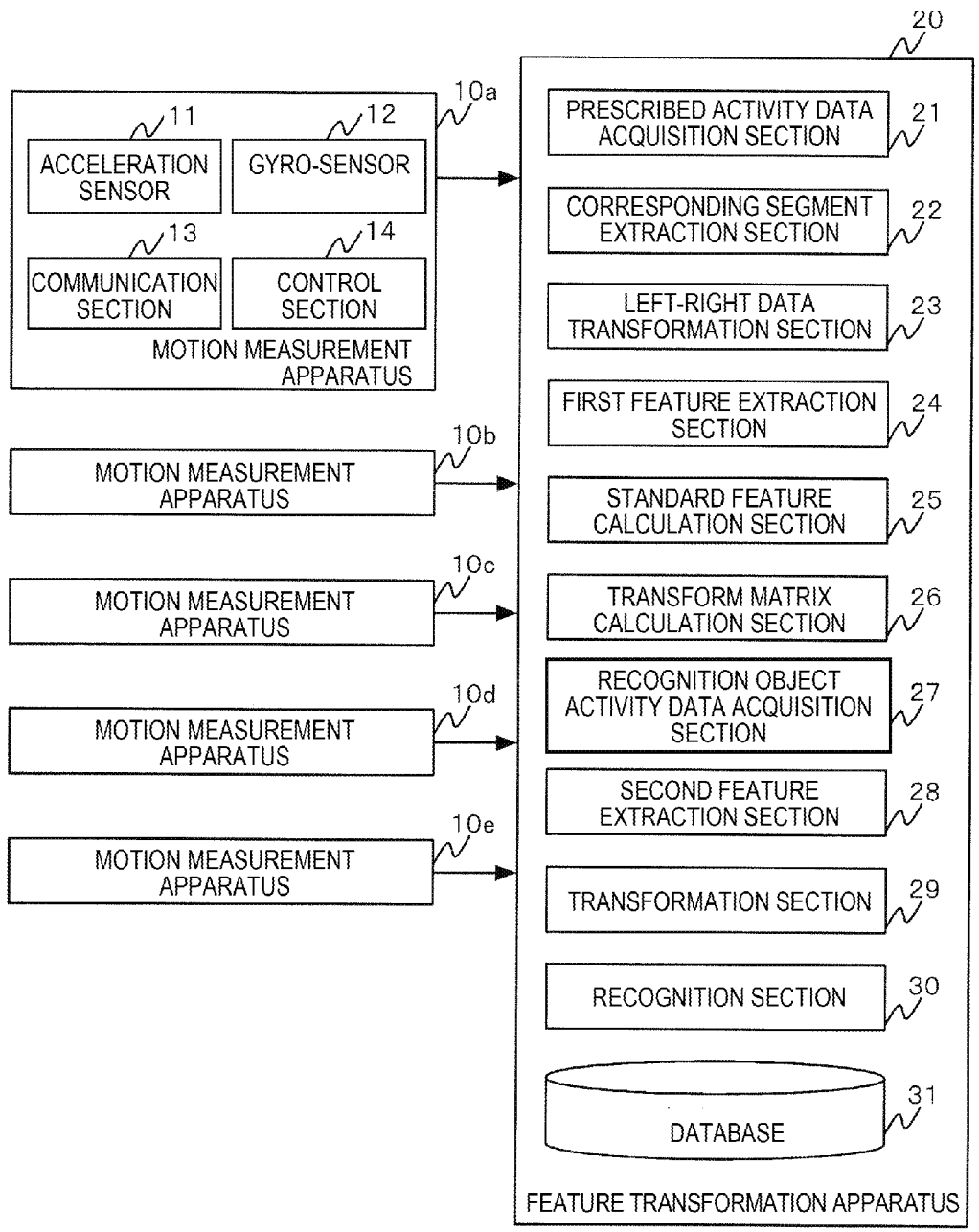
FIG. 1 is a block diagram illustrating a schematic configuration of an activity recognition system according to an embodiment.

FIG. 1 is a block diagram illustrating a schematic configuration of an activity recognition system 1 according to the present embodiment.

As illustrated in FIG. 1, the activity recognition system 1 is configured so as to include motion measurement apparatuses 10a to 10e and a feature transformation apparatus 20. The respective motion measurement apparatuses 10a to 10e and the feature transformation apparatus 20 are connected by wire or wirelessly so as to be capable of communicating with each other and are capable of transmitting and receiving data. In addition to a case where the respective motion measurement apparatuses 10a to 10e and the feature transformation apparatus 20 are connected by wire or wirelessly so as to be capable of communicating with each other, data exchange can also be performed via media such as a USB memory.

Figure 2:
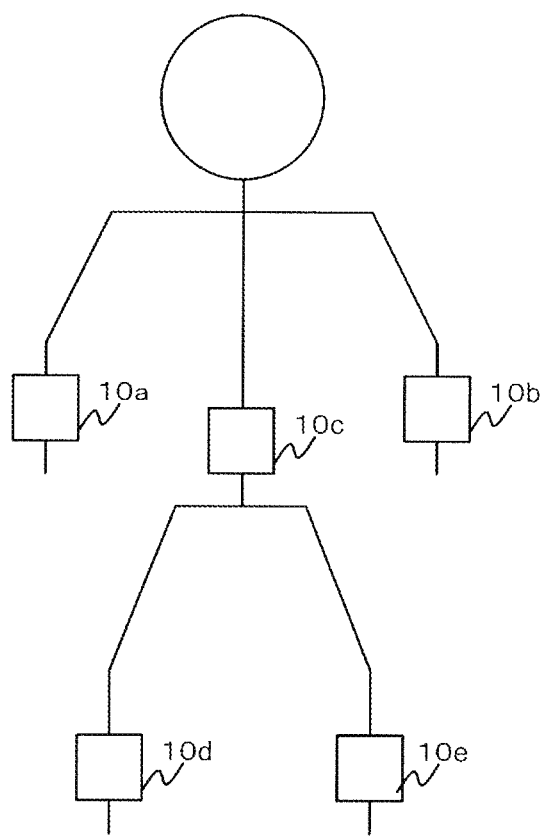

The motion measurement apparatuses 10a to 10e are apparatuses to be mounted on the bodies of an exemplary individual, a reference individual and a subject, and respectively include an acceleration sensor 11, a gyro-sensor 12, a communication section 13 configured to transmit sensor data measured by the respective sensors to the feature transformation apparatus 20; and a control section 14 configured to control the communication section 13 and the respective sensors 11 and 12. The plurality of motion measurement apparatuses 10a to 10e are to be mounted on respective sites of the exemplary individual, the reference individual and the subject including, for example, as illustrated in FIG. 2, the right wrist (10a), the left wrist (10b), the waist (10c), the right leg (10d), and the left leg (10e). While FIG. 2 illustrates a case where the motion measurement apparatuses are arranged so as to be mounted to five sites, the illustrated case is not restrictive and a motion measurement apparatus can be mounted to one or more sites of a body.

Herein, a subject according to the present embodiment refers to a target individual whose activity is to be recognized using the feature transformation apparatus 20. In addition, as will be described later, a reference individual according to the present embodiment refers to a person that performs an activity to form a basis of activity data necessary for generating a standard feature required in order to calculate a transform matrix to be used by the feature transformation apparatus 20 when recognizing an activity of a subject. Furthermore, the reference individual is also a person that performs an activity to form a standard to be learned in advance by a recognition section of the feature transformation apparatus 20 when an activity of a subject is to be recognized by the recognition section. Moreover, as will be described later, an exemplary individual refers to a person that performs an activity to form a basis of activity data to be used by the feature transformation apparatus 20 for estimating corresponding segments of respective activity data of the reference individual and the subject.

In the motion measurement apparatus 10 according to the present embodiment, the acceleration sensor 11 is a triaxial acceleration sensor configured to measure acceleration components in three-dimensional axial directions (x-axis direction, y-axis direction, and z-axis direction), and the gyro-sensor 12 is a triaxial gyro-sensor configured to measure angular velocity components around the three-dimensional axes (around the x-axis, around the y-axis, and around the z-axis).

Since the configurations and functions of the motion measurement apparatuses 10a to 10e and the configurations and functions of the acceleration sensor 11 and the gyro-sensor 12 used in the motion measurement apparatuses 10a to 10e can be considered, in principle, shared with configurations and functions of generally known motion measurement apparatuses, acceleration sensors, and gyro-sensors, detailed descriptions thereof shall be omitted herein. In addition, the acceleration sensor 11 is not limited to a triaxial acceleration sensor as described above and a uniaxial acceleration sensor or a biaxial acceleration sensor can also be used. The same logic applies to the gyro-sensor 12.

The feature transformation apparatus 20 is an apparatus configured to acquire sensor data when the subject performs a recognition object activity from the motion measurement apparatuses 10a to 10e mounted on the subject and to transform a recognition object feature calculated from the sensor data. Moreover, in the present embodiment, the feature transformation apparatus 20 also functions as an activity recognition apparatus configured to recognize an activity of the subject.

Figure 3:
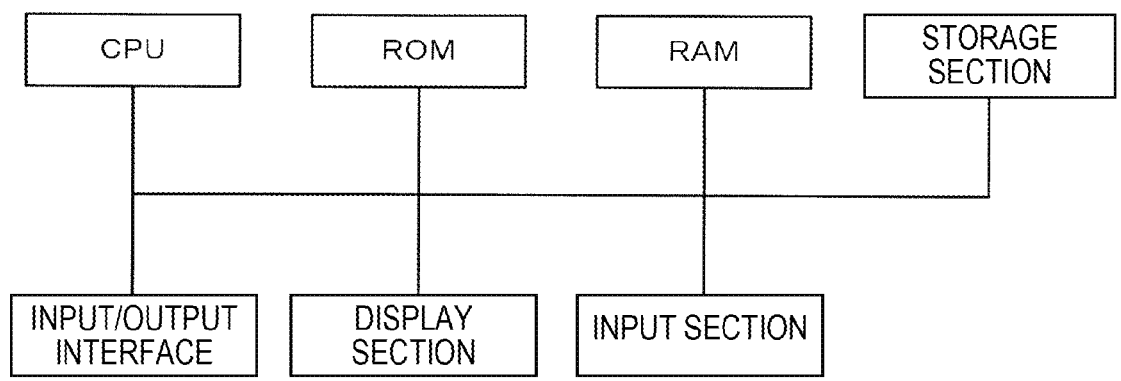
FIG. 3 is a schematic diagram illustrating a hardware configuration of a feature transformation apparatus according to the embodiment.

As illustrated in FIG. 3, the feature transformation apparatus 20 includes hardware similar to that of an ordinary computer device such as a CPU, a ROM coupled by a bus to the CPU, a RAM, a storage section, an input section, a display section, and an input/output interface. Physically, the feature transformation apparatus 20 may either be a dedicated system or a general-purpose information processing apparatus. For example, the feature transformation apparatus 20 can be realized with an information processing apparatus having a general configuration by activating software defining the respective processes in the feature transformation method according to the present disclosure.

From a functional perspective, as illustrated in FIG. 1, the feature transformation apparatus 20 includes a prescribed activity data acquisition section 21, a corresponding segment extraction section 22, a left-right data transformation section 23, a first feature extraction section 24, a standard feature calculation section 25, a transform matrix calculation section 26, a recognition object activity data acquisition section 27, a second feature extraction section 28, a transformation section 29, a recognition section 30, and a database 31. The respective sections can be realized when, for example, primarily the CPU (control unit) executes a program stored in the ROM or the RAM and controls the respective hardware. The database 31 can be realized using the RAM or the storage section (storage unit).

The database 31 stores activity data (prescribed activity data) of a prescribed activity respectively measured and acquired by the exemplary individual, one or more reference individuals, and the subject. Moreover, the prescribed activity data of the exemplary individual is data obtained by segmenting the prescribed activity and labeling, in advance, each segment with recognition information of the activity (activity label) and, as will be described later, activity data to be used in order to estimate corresponding segments of the respective prescribed activity data of the reference individuals and the subject.

The prescribed activity data acquisition section 21 acquires respective prescribed activity data when one or more reference individuals (for example, four reference individuals A1 to A4) and the subject B perform the prescribed activity. In other words, the prescribed activity data acquisition section 21 receives and acquires prescribed activity data Ala to Ale respectively corresponding to the motion measurement apparatuses 10a to 10e and which is measured using the respective motion measurement apparatuses 10a to 10e mounted on the respective sites of the body of the reference individual A1. Prescribed activity data A2a to A2e, A3a to A3e, A4a to A4e, and Ba to Be is respectively acquired in a similar manner by the reference individuals A2, A3, and A4 and the subject B. The prescribed activity data Ala to Ale, A2a to A2e, A3a to A3e, A4a to A4e, and Ba to Be can respectively be expressed as time-series data of a six-dimensional vector v=(gx, gy, gz, ax, ay, az) including acceleration components in three-dimensional axial directions and angular velocity components around the three-dimensional axes.

Herein, a prescribed activity is a series of postures/activities prescribed in advance to be performed by the exemplary individual C or the reference individuals A1 to A4 and the subject B while wearing the motion measurement apparatus 10. The prescribed activity can be arranged as, for example, a series of postures/activities performed in so-called "deep breathing" in which from an "attention" posture, arms are extended straight forward to a "stand at arm's length" posture, the arms are next raised straight up while still being extended to take a "point the hands at the sky" posture, the arms are next lowered so as to become parallel to the front of one's body to take a "spread arms to the sides" posture, and then further lowering the arms still parallel to the front of the body to resume the "attention" posture.

In addition, at each posture, in order to maintain a stationary state for a certain period of time, for example, when data is measured by the acceleration sensor, a posture is to be included at which the gravitational acceleration component acting on the site where the motion measurement apparatus is mounted takes a value of 0 or a maximum/minimum value (±1G). As a result, segmentation can be performed in which a stationary state in each posture and an active state from each posture to a next posture constitute segments (detection segments). For example, the aforementioned example of the series of postures/activities of "deep breathing" can be segmented into nine prescribed postures/activities including: the "attention" posture; an activity from the "attention" posture to the "stand at arm's length" posture; the "stand at arm's length" posture; an activity from the "stand at arm's length" posture to the "point the hands at the sky" posture; the "point the hands at the sky" posture; an activity from the "point the hands at the sky" posture to the "spread arms to the sides" posture; the "spread arms to the sides" posture; an activity from the "spread arms to the sides" posture to the "attention" posture; and the "attention" posture.

In addition to the case of "deep breathing" described above, the prescribed activity may be arranged as a series of prescribed postures/activities in which a combination of postures and/or activities using the entire upper body, the entire lower body, or the entire body is performed, including a scenario made up of a series of activities involving full-body motion such as radio calisthenics and activities likely to be performed by worker in various practices (for example, sanitary hand-washing, disinfection, measurement of vital signs, and intravenous fluid preparation to be carried out by a nurse). Furthermore, the prescribed activity can include characteristic prescribed postures/activities using the dominant hand or the dominant leg of the reference individuals A1 to A4 or the subject B, such as a series of prescribed postures/activities involving throwing a ball with the right hand, using a kitchen knife with the right hand, and kicking a ball with the left leg.

The prescribed activity data acquisition section 21 labels prescribed activity data Ala to Ale, A2a to A2e, A3a to A3e, and A4a to A4e respectively measured by motion measurement apparatuses 10a to 10e mounted on the reference individuals A1 to A4 and made up of time-series data of a six-dimensional vector for each segment resulting from a segmentation of the prescribed activity with recognition information of the activity (activity label), and stores the labeled prescribed activity data in the database 31. Moreover, the prescribed activity can be respectively performed a plurality of times by the reference individuals A1 to A4 and the subject B, whereby prescribed activity data can be respectively acquired a plurality of times.

The corresponding segment extraction section 22 uses respective prescribed activity data of the reference individuals and the subject to extract corresponding segments of the respective prescribed activity data of the reference individuals and the subject. Specifically, in order to extract corresponding segments of respective prescribed activity data of the reference individuals and the subject, the corresponding segment extraction section 22 acquires prescribed activity data Ca to Ce of the exemplary individual measured and acquired in advance from the database 31, compares the acquired exemplary prescribed activity data Ca to Ce with respective prescribed activity data Ala to Ale, A2a to A2e, A3a to A3e, A4a to A4e, and Ba to Be, and extracts segments respectively corresponding to the reference individuals A1 to A4, the subject B and the exemplary individual C using a method such as DP matching for detecting degrees of similarity between two pieces of time-series data.

In other words, using DP matching, segments/activity labels of prescribed activity data of the reference individuals A1 to A4 and the subject B corresponding to the segments/activity labels of the prescribed activity data of the exemplary individual C segmented as described above are estimated. For example, when extracting segments corresponding to prescribed activity data Ca and prescribed activity data Ala measured by having the exemplary individual C and the reference individual A1 wear the motion measurement apparatus 10a on their right wrists, prescribed activity data of a single segment of the "attention" posture of the exemplary individual C and prescribed activity data of a single segment of the "attention" posture of the reference individual A1 corresponding to the same segment are to be extracted. Moreover, while a detailed description of the method described above using DP matching will be omitted herein since the method is similar to conventional DP matching, DP matching uses, for example, a Euclidean distance between raw data as a distance scale.

The left-right data transformation section (data transformation section) 23 performs data transformation so as to associate relevant prescribed activity data of the subject B with relevant prescribed activity data of the reference individuals A1 to A4 when at least one site among the dominant hand and the dominant leg of the subject B differs from that of the dominant hands and the dominant legs of the reference individuals A1 to A4. The reference individuals A1 to A4 can be arranged in advance as individuals sharing the same dominant hand/dominant leg (for example, right hand/right leg).

Figure 4:
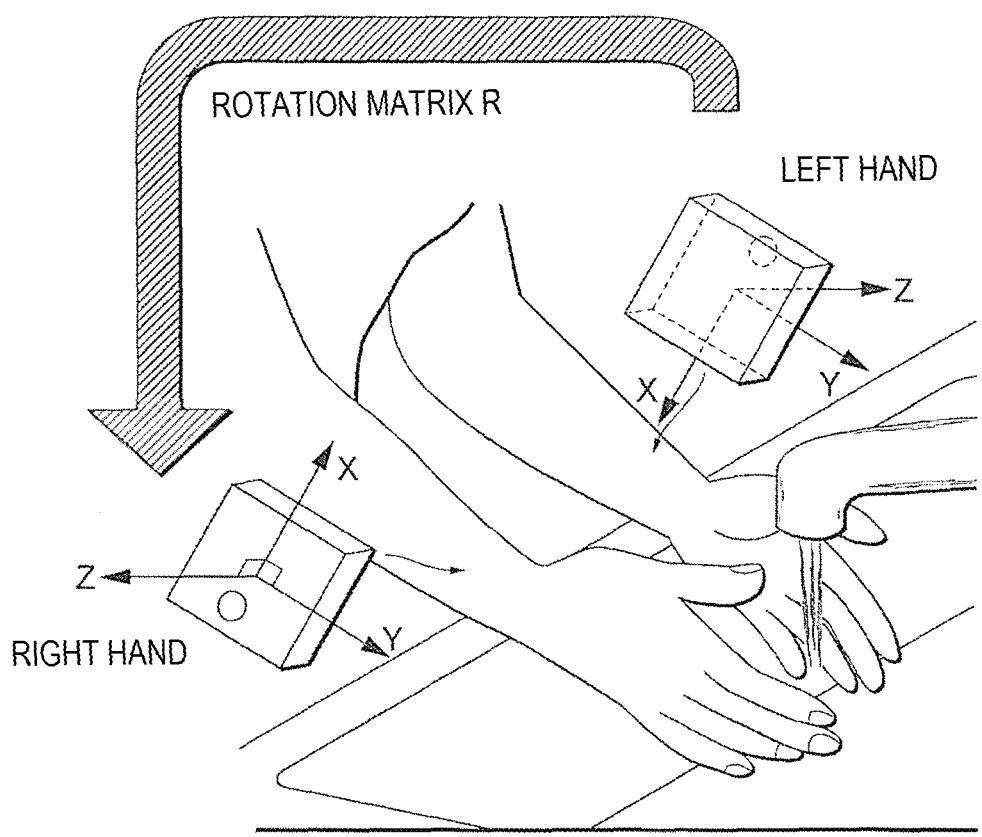
FIG. 4 is a diagram for describing a rotation matrix R for transforming right-hand data into left-hand data according to the embodiment.

The left-right data transformation section 23 assumes that, for example, information on the dominant hands and the dominant legs of the reference individuals A1 to A4 and the subject B is inputted to the feature transformation apparatus 20 in advance, and when the reference individuals A1 to A4 are right-handed and the subject B is left-handed, performs data transformation of prescribed activity data of the left wrist (left hand data) measured by the motion measurement apparatus 10a mounted on the left wrist of the subject B into prescribed activity data of the right wrist (right hand data). Moreover, a hand/leg that is not the dominant hand/dominant leg can be transformed in the same manner. For example, as illustrated in FIG. 4, the transformation can be performed utilizing the symmetry of the body using a simple rotation matrix R. In other words, when a coordinate system during measurement is set as illustrated in FIG. 4, prescribed activity data that is a measurement of the activity of the left wrist can be transformed into a mirror image as prescribed activity data that is a measurement of the activity of the right wrist using equation (1) on the acceleration component so as to invert only acceleration data measured on the x-axis and using equation (2) on the angular velocity component so as to invert elements other than the x-axis. Moreover, the rotation matrix R can be set according to the coordinate system during measurement or, more specifically, according to orientations in which the motion measurement apparatuses are mounted to respective sites, and the like.

[Expression 1]

$$R_a = \begin{bmatrix} -1 & 0 & 0 \\ 0 & 1 & 0 \\ 0 & 0 & 1 \end{bmatrix} \quad (1)$$

$$R_\Omega = \begin{bmatrix} 1 & 0 & 0 \\ 0 & -1 & 0 \\ 0 & 0 & -1 \end{bmatrix} \quad (2)$$

Therefore, in the case illustrated in FIG. 4, a left-right transform matrix that transforms prescribed activity data of the left wrist (left-hand data) into prescribed activity data of the right wrist (right-hand data) is expressed as equation (3) given below.

[Expression 2]

$$R_a = \begin{bmatrix} R_a & 0 \\ 0 & R_\Omega \end{bmatrix} \quad (3)$$

The first feature extraction section 24 extracts, per site, reference individual features (reference individual feature vectors) of respective prescribed activity data of the reference individuals A1 to A4 and a subject feature (subject feature vector) of the prescribed activity data of the subject B from prescribed activity data A1a to A1e, A2a to A2e, A3a to A3e, and A4a to A4e of the reference individuals A1 to A4 and prescribed activity data Ba to Be of the subject B acquired at the prescribed activity data acquisition section 21. Moreover, when the respective prescribed activity data of the reference individuals A1 to A4 and the subject B is respectively acquired a plurality of number of times by the prescribed activity data acquisition section 21, reference individual features and subject features are respectively extracted in correspondence to the plurality of number of times.

A feature extraction method will now be described. When extracting respective reference individual features and subject features from respective prescribed activity data (acceleration data and angular velocity data), the first feature extraction section 24 applies, for example, a sliding window having a certain period of time (a certain time window) to time-series data for each detection segment of the respective prescribed activity data, and for each window, determines an average and a standard deviation of the respective pieces of data in the window as an average feature vector and a standard deviation vector. Subsequently, for each detection segment of the respective prescribed activity data, average values of the average feature vectors and the standard deviation vectors of the respective windows included in the segment are determined to obtain an average vector μ (six-dimensional vector) and a deviation vector σ (six-dimensional vector) or, in other words, a twelve-dimensional feature vector. By extracting an average vector μ and a deviation vector σ for each detection segment obtained by segmenting the prescribed activity, when there is a total of n-number of detection segments of the prescribed postures/activities, n-number of segments' worth of the twelve-dimensional features (feature vectors) can be extracted with respect to prescribed activity data measured by a single motion measurement apparatus 10a. Subsequently, features (feature vectors) are extracted in the same manner from prescribed activity data measured by the other motion measurement apparatuses 10b to 10e. Moreover, the technique described in the aforementioned document, Ling Bao, Stephen S. Intille, "Activity Recognition from User-Annotated Acceleration Data", In Second International Conference on Pervasive Computing, pp. 1-17, 2004 and the like can be used as a method of extracting such features.

Figure 5:
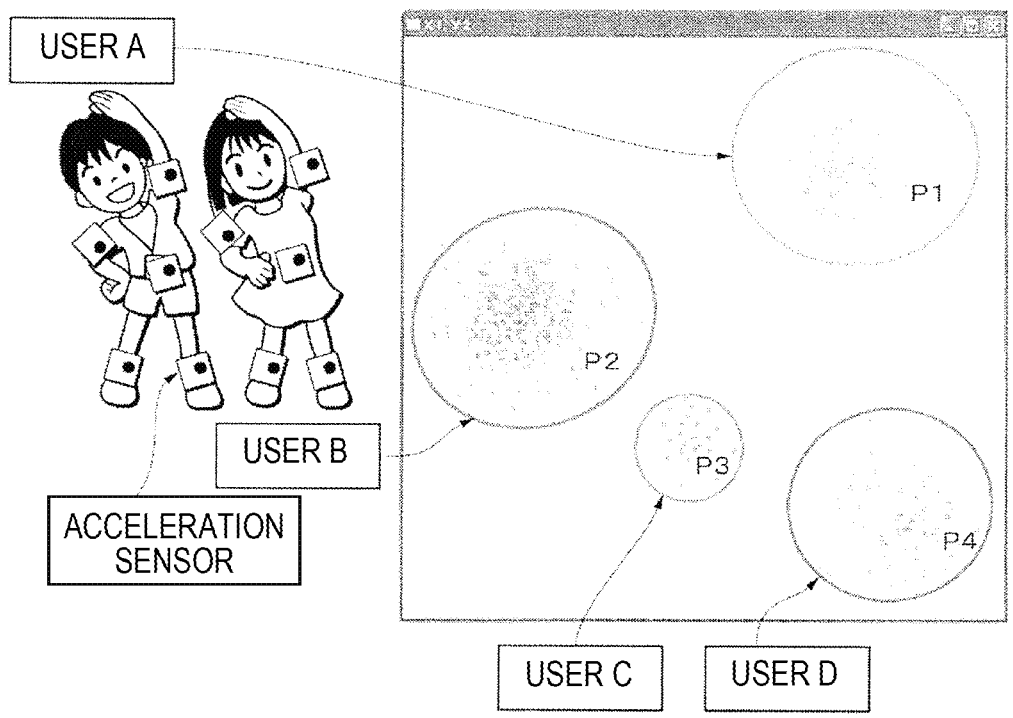
FIG. 5 is a diagram illustrating an example where reference individual features are clustered according to the embodiment.

The standard feature calculation section 25 calculates at least one standard feature based on respective reference individual features extracted for each reference individual A1 to A4. When calculating a single standard feature, for example, an average feature of the respective reference individual features extracted for each reference individual A1 to A4 is to be used as the standard feature. In addition, when calculating a plurality of standard features, for example, the respective reference individual features are clustered into a plurality of clusters and an average feature of the reference individual features included in each cluster is to be used as a standard feature. Adoptable clustering methods include a k-means method and an EM (Expectation Maximization) method. For instance, an example of clustering performed on features of the same activity by the reference individuals A1 to A4 is illustrated in FIG. 5. Clustered features (feature clusters) can generally be expressed by a multivariate normal distribution. Assuming that a given prescribed activity $a_i \in \{a1, a2, \ldots, an\}$ has been divided into four clusters, respective average vectors are denoted as $\mu_k$ (k=1, 2, 3, 4) and set as a standard feature model. The same calculation is performed on all n-number of detection segments so that a standard feature model having an appropriate number of clusters is constructed for each of the detection segments.

The transform matrix calculation section 26 calculates, per site, a transform matrix between a standard feature and the subject feature based on information on a corresponding segment extracted as described above. When calculating a plurality of standard features, the transform matrix calculation section 26 respectively calculates difference values between each standard feature and the subject feature and calculates a transform matrix between a single standard feature whose calculated difference value is the smallest and the subject feature. The difference values between the respective standard features and the subject feature can be expressed as Euclidean distances between an average vector of the subject feature of the subject and the respective average vectors $\mu_k$ (k=1, 2, 3, 4) of the standard features. The transform matrix calculation section 26 selects a feature cluster whose Euclidean distance is the shortest or, in other words, a single standard feature whose difference value is the smallest, and calculates a transform matrix between the single standard feature and the subject feature. The calculated transform matrix is stored in the database 31.

A calculation method of the aforementioned transform matrix will now be described. If respective feature vectors (twelve-dimensional vectors) in a single detection segment i extracted from prescribed activity data A1a and Ba measured at corresponding sites a of a single reference individual (for example, the reference individual A1) and the subject B are respectively denoted as $\mu_{i,A1}$ and $\mu_{i,B}$, then a relationship between the feature vectors can be expressed as an affine transform by equation (4). Therefore, from equation (4), a transform matrix $T_{ai}$ can be calculated which performs an affine transform from a feature vector of a reference individual to a feature vector of a subject with respect to the single detection segment i. In the present embodiment, an average of transform matrices $T_{ai}$ (i=1, . . . , n) calculated for each segment is determined to be used as a transform matrix (feature standardization matrix) T that performs an affine transform from a subject feature of the subject to a reference individual feature of a reference individual. Moreover, methods that can be used for the feature standardization matrix T include a maximum likelihood linear regression (MLLR) method and a maximum a posteriori probability (MAP) method which are widely used in speaker adaptation techniques for speech recognition, or an MLLR-MAP method that combines the two methods (reference: Digalakis, V. V.; Neumeyer, L. G., "Speaker Adaptation using Combined Transformation and Bayesian methods", IEEE Trans. On Speech and Audio Processing, Vol. 4, Issue 4, pp. 294-300, 1996).

[Expression 3], $$\mu_{i,A1}=A_i\mu_{i,B}+b_i=T_{ai}\xi_i$$

where $\xi_i=[1, \mu_{i,B}]'$ is an extended mean vector, $T_{ai}=[b_i, A_i]'$ is a transform matrix, $A_i$ is a 12 by 12 matrix, and $b_i$ is a twelve-dimensional vector.

The recognition object activity data acquisition section 27 acquires recognition object activity data when the subject B performs a recognition object activity. In other words, the recognition object activity data acquisition section 27 receives and acquires recognition object activity data Xa to Xe measured using respective motion measurement apparatuses 10a to 10e mounted on the respective sites of the body of the subject B. The acquired recognition object activity data is stored in the database 31.

The second feature extraction section 28 extracts, per site, a recognition object feature (recognition object feature vector) x of the recognition object activity data of the subject B from the measured recognition object activity data of the subject. The second feature extraction section is capable of extracting the recognition object feature x using a similar method as the first feature extraction section.

The transformation section 29 transforms the recognition object feature x of the recognition object activity data into a subject standard feature (standard feature vector) x* using the transform matrix T.

The recognition section 30 is a recognition instrument configured to recognize a recognition object activity of the subject from a subject standard feature. The recognition section 30 acquires, per cluster, recognition object activity data from a reference individual corresponding to each cluster and creates a recognition instrument using a feature extracted from the acquired recognition object activity data as learning data. For example, assuming that the respective reference individual features of the reference individuals A1 to A4 have been clustered into four clusters P1 to P4, the recognition section 30 creates a recognition instrument using a reference individual feature corresponding to the cluster P1 as learning data. Reference individual features corresponding to the clusters P2 to P4 are processed in the same manner. Therefore, by transforming a recognition object feature of recognition object activity data of the subject into a subject standard feature using a transform matrix corresponding to a single cluster, the feature of the subject can be obtained when a physique or the like corresponding to the cluster is assumed. As a result, a difference between the physique or the like of the subject and a physique or the like corresponding to the cluster can be absorbed and a recognition object activity of the subject can be recognized with high accuracy with respect to an unknown activity of the subject. Moreover, in the present embodiment, various recognition methods such as a support vector machine (SVN), k-NN, HMM and the like can be applied as the recognition section.

Hereinafter, a feature transformation method according to the present embodiment to be performed using the feature transformation apparatus 20 will be described with reference to a flow chart illustrated in FIG. 6. The flow illustrated in FIG. 6 includes: a transform matrix calculation stage configured to measure respective prescribed activity data of the reference individuals A1 to A4 and the subject B and calculate a transform matrix; and a recognition stage configured to recognize a recognition object activity of an actual subject after calculating the transform matrix. It is assumed that the database 31 stores prescribed activity data of the exemplary individual obtained in advance by measuring a prescribed activity of the exemplary individual, where the prescribed activity has been segmented and the respective segments labeled in advance with activity recognition information (activity label). In addition, the respective processes illustrated in the flow charts in the respective drawings can be executed by arbitrarily rearranging the sequence of processes or executed in parallel in so far as discrepancies do not arise in the contents of the processes.

First, as the transform matrix calculation stage, the feature transformation apparatus 20 acquires respective prescribed activity data when the reference individuals A1 to A4 perform a prescribed activity (step S100). In other words, the feature transformation apparatus 20 receives and acquires prescribed activity data A1a to A1e respectively corresponding to the motion measurement apparatuses 10a to 10e and which is measured by the respective motion measurement apparatuses 10a to 10e mounted on the respective sites of the body of the reference individual A1. Prescribed activity data A2a to A2e, A3a to A3e and A4a to A4e is respectively acquired in a similar manner by the reference individuals A2, A3, and A4. In addition, the feature transformation apparatus 20 labels prescribed activity data A1a to A1e, A2a to A2e, A3a to A3e, and A4a to A4e respectively measured by motion measurement apparatuses 10a to 10e mounted on the reference individuals A1 to A4 with recognition information of the activity (activity label), and stores the labeled prescribed activity data in the database 31.

Next, the feature transformation apparatus 20 extracts segments corresponding to the respective prescribed activity data of the reference individuals A1 to A4 and the exemplary individual C using the respective prescribed activity data of the reference individuals A1 to A4 and the exemplary individual C (step S101). In other words, the feature transformation apparatus 20 compares the respective prescribed activity data A1a to A1e, A2a to A2e, A3a to A3e, and A4a to A4e with prescribed activity data Ca to Ce of the exemplary individual measured in advance and whose segments created by segmenting the prescribed activity have been labeled, and extracts segments respectively corresponding to the reference individuals A1 to A4 and the exemplary individual C using a method such as DP matching for detecting degrees of similarity between two pieces of time-series data. Moreover, the prescribed activity can be arranged so as to be respectively performed a plurality of times by the reference individuals A1 to A4 and each prescribed activity data be respectively acquired a plurality of times.

Next, the feature transformation apparatus 20 extracts, per site, a reference individual feature of the respective prescribed activity data of the reference individuals A1 to A4 from the prescribed activity data A1a to A1e, A2a to A2e, A3a to A3e, and A4a to A4e of the reference individuals A1 to A4 (step S102). Extraction performed according to the extraction method described above results in obtaining, per site, twelve-dimensional vectors corresponding to the n-number of segments of the prescribed activity as the respective subject features.

Subsequently, at least one standard feature is calculated, per site, based on respective reference individual features extracted for each reference individual A1 to A4 (step S103). When calculating a plurality of standard features, for example, the respective reference individual features are clustered into a plurality of clusters and an average feature of the reference individual features included in each cluster is to be used as a standard feature. An example of clustering performed on features of the same activity by the reference individuals A1 to A4 is illustrated in FIG. 5. Clustered features (feature clusters) can generally be expressed by a multivariate normal distribution. Assuming that a given prescribed activity $a_i \in \{a1, a2, \ldots, an\}$ has been divided into four clusters, respective average vectors may be denoted as $\mu_k$ (k=1, 2, 3, 4) and set as a standard feature model.

Next, the feature transformation apparatus 20 acquires prescribed activity data when the subject B performs the prescribed activity (step S104). In other words, in the same manner as in the case of the reference individuals A1 to A4 described above, the feature transformation apparatus 20 acquires prescribed activity data Ba to Be of the subject B, labels the acquired prescribed activity data Ba to Be with recognition information of the activity (activity labels), and stores the labeled prescribed activity data Ba to Be in the database 31.

Subsequently, the feature transformation apparatus 20 extracts segments corresponding to the respective prescribed activity data of the subject B and the exemplary individual C using the respective prescribed activity data of the subject B and the exemplary individual C (step S105). In other words, the feature transformation apparatus 20 compares the prescribed activity data Ba to Be with prescribed activity data Ca to Ce of the exemplary individual and extracts segments respectively corresponding to the subject B and the exemplary individual C using a method such as DP matching for detecting degrees of similarity between two pieces of time-series data. Moreover, the prescribed activity can be arranged so as to be respectively performed a plurality of times by the subject B and each prescribed activity data be respectively acquired a plurality of times.

Next, the feature transformation apparatus 20 performs data transformation so as to associate relevant prescribed activity data of the subject B with relevant prescribed activity data of the reference individuals A1 to A4 when at least one site among the dominant hand and the dominant leg of the subject B differs from the site among the dominant hands and the dominant legs of the reference individuals A1 to A4 (step S106). Assuming that information on the dominant hands and the dominant legs of the reference individuals A1 to A4 and the subject B is inputted to the feature transformation apparatus 20 in advance, when the reference individuals A1 to A4 are right-handed and the subject B is left-handed, data transformation is performed on prescribed activity data of the left wrist (left hand data) measured by the motion measurement apparatus 10a mounted on the left wrist of the subject B into prescribed activity data of the right wrist (right hand data).

Subsequently, the feature transformation apparatus 20 extracts, per site, a subject feature of the prescribed activity data of the subject B from the prescribed activity data Ba to Be of the subject B (step S107). Extraction performed according to the extraction method described above results in obtaining twelve-dimensional vectors corresponding to the n-number of segments of the prescribed activity as the subject feature.

Next, the feature transformation apparatus 20 calculates, per site, a transform matrix between the standard feature and the subject feature based on information on corresponding segments extracted as described above (step S108). When calculating a plurality of standard features, the transform matrix calculation section 26 respectively calculates difference values between each standard feature and the subject feature and calculates a transform matrix between a single standard feature whose calculated difference value is the smallest and the subject feature based on information on corresponding segments extracted as described above. For example, when a difference value between the standard feature and the subject feature of the cluster P1 is the smallest, a transform matrix T between the standard feature of the cluster P1 and the subject feature can be determined using the transform matrix calculation method described above. The acquired transform matrix T is stored in the database 31.

Subsequently, as a recognition stage, the feature transformation apparatus 20 first acquires recognition object activity data when the subject B performs a recognition object activity (step S109). In other words, the feature transformation apparatus 20 receives and acquires recognition object activity data Xa to Xe measured using respective motion measurement apparatuses 10a to 10e mounted on the respective sites of the body of the subject B. The acquired recognition object activity data Xa to Xe is stored in the database 31.

Next, the feature transformation apparatus 20 extracts, per site, a recognition object feature of the recognition object activity data of the subject B from the measured recognition object activity data of the subject (step 110). Extraction performed according to the extraction method described above results in obtaining, per site, n-number of segments' worth of twelve-dimensional vectors as the recognition object feature.

Subsequently, the feature transformation apparatus 20 transforms the recognition object feature x of recognition object activity data into a subject standard feature x* using the transform matrix T (step S111). For example, a recognition object feature $\mu^B(t)$ of the subject B is transformed into a subject standard feature $\mu^{B \to A1}(t)$ using the transform matrix T.

Next, the feature transformation apparatus 20 recognizes the recognition object activity of the subject based on the subject standard feature x* (step S112). Moreover, before recognizing the recognition object activity of the subject, the feature transformation apparatus 20 acquires, per cluster, recognition object activity data from a reference individual corresponding to each cluster and creates, in advance, a recognition instrument using a feature extracted from the acquired recognition object activity data as learning data.

As described above, with the feature transformation apparatus and the feature transformation method according to the present embodiment, by measuring respective prescribed activity data of reference individuals A1 to A4 and a subject B in advance and calculating respective reference individual features and a subject feature, calculating a standard feature from the respective calculated reference individual features, determining a transform matrix that transforms the subject feature of the subject into a standard feature, and transforming a recognition object feature of a recognition object activity of the subject using the transform matrix, the recognition object activity of the subject can be recognized while taking into consideration differences in physique such as gender and age, individual differences such as dominant hands and dominant legs, and differences such as deviations in sensor mounting positions or the like.

In addition, the feature transformation apparatus and the feature transformation method according to the present disclosure can be used for all applications requiring feature transformation using sensor data. Specifically, the feature transformation apparatus and the feature transformation method according to the present embodiment can be used for applications to be used in various business fields such as: the field of amusement in the form of games and the like using human activity recognition; the motion picture/animated film industry for the purpose of transforming activities of an actor/actress into activities of a CG character; the fields of medicine, nursing care, and rehabilitation for recognizing activities of a doctor, nurse and the like to provide treatment support to a distant patient; and to realize robotic operations in hazardous environments such as a nuclear power plant or outer space/deep water.

It is to be understood that the present disclosure is not limited to the embodiment described above in reference to the figures, and that various modifications, additions, and omissions may be made by those skilled in the art without departing from the spirit and the scope of the present disclosure as set out in the accompanying claims.

For example, while the embodiment above has been described using an example of a motion measurement apparatus incorporating both an acceleration sensor and a gyro-sensor, the present disclosure is not limited thereto and can be arranged so as to employ, for example, only an acceleration sensor or only a gyro-sensor.

In addition, while a case where a corresponding segment extraction section 22 is provided to identify corresponding segments obtained by segmentation has been described as an example in the above embodiment, the present disclosure is not limited thereto and the corresponding segment extraction section 22 can alternatively be omitted. In this case, for example, by measuring prescribed activity data of the reference individual A1 and defining corresponding segments of the prescribed activity data in advance, and having the feature transformation apparatus 20 prompt the reference individuals A2 to A4 and the subject B to perform postures/activities for each corresponding segment, segments shared between prescribed activity data of the reference individuals A1 to A4 and subject B can be associated.

Furthermore, while an example in which dominant hands/dominant legs of the reference individuals A1 to A4 and the subject B are taken into consideration has been described in the above embodiment, the present disclosure is not limited thereto and the feature transformation apparatus can be used while imposing restrictions on dominant hands/dominant legs. In such a case, the left-right data transformation section 23 can be omitted.

Moreover, while a case where there are four reference individuals has been described as an example in the above embodiment, the present disclosure is not limited thereto and at least one reference individual shall suffice. For example, the number of reference individuals can be set to one and a transform matrix between the reference individual and a subject can be calculated.

In addition, while a configuration in which respective sections having respective processing functions are provided in the feature transformation apparatus 20 has been described in the embodiment above, the present disclosure is not limited thereto and a portion or all of the respective sections may be distributed and assigned to other apparatuses connected via a network to the feature transformation apparatus 20 so as to be capable of communicating with each other. For example, instead of providing the recognition section 30 in the feature transformation apparatus 20 itself, the recognition section 30 may be used as another apparatus.

Furthermore, while sections with different intended uses are respectively provided in the feature transformation apparatus 20, some of the respective sections provided in the feature transformation apparatus 20 may be configured so as to be integrated or a single section may be configured so as to be further divided into a plurality of sections.

What is claimed is:

1. A feature transformation apparatus comprising:
a prescribed activity data acquisition section configured to acquire respective prescribed activity data of one or more reference individuals, an example individual, and a subject based on the one or more reference individuals, the example individual, and the subject performing a prescribed activity;
a corresponding segment extraction section configured to segment the prescribed activity performed by the example individual into example segments, to compare the example segments to the prescribed activity performed by the one or more reference individuals to extract a reference individual segment for each of the one or more reference individuals, and to compare the example segments to the prescribed activity performed by the subject to extract a subject individual segment;
a first feature extraction section configured to extract a reference individual feature of the prescribed activity data for each of the one or more reference individuals based on the reference individual segment for each of the one or more references and a subject feature of the prescribed activity data of the subject based on the subject individual segment for the subject;
a standard feature calculation section configured to calculate at least one standard feature based on the one or more reference individual features;
a transform matrix calculation section configured to associate the calculated standard feature and the subject feature;
a recognition object activity data acquisition section configured to acquire recognition object activity data when the subject performs a recognition object activity;
a second feature extraction section configured to extract a recognition object feature from the recognition object activity data of the subject;
a transformation section configured to transform the recognition object feature into a subject standard feature based on the association between the calculated standard feature and the subject feature; and a recognition section configured to recognize the recognition object activity of the subject from the subject standard feature.

2. The feature transformation apparatus according to claim 1, further comprising:
a left-right data transformation section configured to perform data transformation so as to associate relevant prescribed activity data of the subject with relevant prescribed activity data of the one or more reference individuals when at least one site among a dominant hand and a dominant leg of the subject differs from that of dominant hands and dominant legs of the one or more reference individuals.

3. The feature transformation apparatus according to claim 1,
wherein the respective prescribed activity data is obtained from triaxial acceleration sensors and triaxial gyro-sensors.

4. A feature transformation apparatus comprising:
a prescribed activity data acquisition section configured to acquire respective prescribed activity data of one or more reference individuals, an example individual, and a subject based on the one or more reference individuals, the example individual, and the subject performing a prescribed activity;
a corresponding segment extraction section configured to segment the prescribed activity performed by the example individual into example segments, to compare the example segments to the prescribed activity performed by the one or more reference individuals to extract a reference individual segment for each of the one or more reference individuals, and to compare the example segments to the prescribed activity performed by the subject to extract a subject individual segment;
a first feature extraction section configured to extract a reference individual feature of the prescribed activity data for each of the one or more reference individuals based on the reference individual segment for each of the one or more references and a subject feature of the prescribed activity data of the subject based on the subject individual segment for the subject;
a standard feature calculation section configured to calculate at least one standard feature based on the one or more reference individual features;
a transform matrix calculation section configured to associate the calculated standard feature and the subject feature;
a recognition object activity data acquisition section configured to acquire recognition object activity data when the subject performs a recognition object activity;
a second feature extraction section configured to extract a recognition object feature from the recognition object activity data of the subject; and
a transformation section configured to transform the recognition object feature based on the association between the calculated standard feature and the subject feature.

5. The feature transformation apparatus according to claim 4, wherein:
when there are a plurality of the reference individuals, and when the standard feature calculation section is configured to calculate a plurality of the calculated standard features,
the transform matrix calculation section is configured so as to respectively calculate difference values between the respective calculated standard features and the subject feature and to calculate a transform matrix between the subject feature and a single feature with the difference value that is smallest, wherein the respective calculated standard features and the subject feature are associated based on the transform matrix.

6. The feature transformation apparatus according to claim 4, further comprising:
a recognition section configured to recognize a recognition object activity of the subject from the recognition object feature transformed by the transformation section.

7. The feature transformation apparatus according to claim 4, wherein:
the feature transformation apparatus is included in a system that includes a motion measurement apparatus.

8. The feature transformation apparatus according to claim 7, wherein:
the motion measurement apparatus includes an acceleration sensor.

9. The feature transformation apparatus according to claim 7, wherein:
the motion measurement apparatus includes a gyro-sensor.

10. The feature transformation apparatus according to claim 7, wherein:
the motion measurement apparatus includes a communication section configured to transmit sensor data from the motion measurement apparatus to the feature transformation apparatus.

11. The feature transformation apparatus according to claim 10, wherein:
the communication section is configured to transmit sensor data wirelessly.

12. The feature transformation apparatus according to claim 4, further comprising:
a left-right data transformation section configured to perform data transformation so as to associate particular prescribed activity data of the subject with particular prescribed activity data of the one or more reference individuals when at least one site among a dominant hand and a dominant leg of the subject differs from that of dominant hands and dominant legs of the one or more reference individuals.

13. A feature transformation method to be executed by an information processing apparatus including a control unit and a storage unit, the feature transformation method comprising:
the control unit acquiring respective prescribed activity data of one or more reference individuals, an example individual, and a subject based on the one or more reference individuals, the example individual, and the subject performing a prescribed activity and storing the respective prescribed activity data in the storage unit;
the control unit reading out respective prescribed activity data stored in the storage unit and segmenting the prescribed activity performed by the example individual into example segments, comparing the example segments to the prescribed activity performed by the one or more reference individuals to extract a reference individual segment for each of the one or more reference individuals, and comparing the example segments to the prescribed activity performed by the subject to extract a subject individual segment and storing the reference individual segments and the subject individual segment in the storage unit;
the control unit reading out the reference individual segments and the subject individual segment data stored in the storage unit and extracting a reference individual feature of the prescribed activity data for each of the one or more reference individuals based on the reference individual segment for each of the one or more references and a subject feature of the prescribed activity data of the subject based on the subject individual segment for the subject;

the control unit calculating at least one standard feature based on the one or more reference individual features;

the control unit associating the calculated standard feature and the subject feature;

the control unit acquiring recognition object activity data when the subject performs a recognition object activity and storing the recognition object activity data in the storage unit;

the control unit reading out the recognition object activity data of the subject stored in the storage unit and extracting a recognition object feature from the read-out recognition object activity data; and the control unit transforming the recognition object feature using the association between the calculated standard feature and the subject feature.

14. The feature transformation method according to claim 13, wherein:

acquiring respective prescribed activity data of one or more reference individuals and a subject comprises receiving the prescribed activity data that has been generated using one or more motion measurement apparatuses.

15. The feature transformation method according to claim 14, wherein:

each of the one or more motion measurement apparatuses includes at least one of an acceleration sensor and a gyro-sensor.

16. The feature transformation method according to claim 15, wherein:

each of the one or more motion measurement apparatuses includes a triaxial acceleration sensor and a triaxial gyro-sensor.

17. The feature transformation method according to claim 13, further comprising:

the control unit performing a left-right data transformation to associate particular prescribed activity data of the subject with particular prescribed activity data of the reference individuals when at least one site among a dominant hand and a dominant leg of the subject differs from that of dominant hands and dominant legs of the reference individuals.

18. The feature transformation method according to claim 13, wherein:

acquiring respective prescribed activity data of the one or more reference individuals and the subject comprises receiving the prescribed activity data from one or more motion measurement apparatuses associated with the one or more reference individuals and the subject.

19. The feature transformation apparatus according to claim 1, wherein the transform matrix calculation section is configured to associate the calculated standard feature and the subject feature by calculating a transform matrix between the calculated standard feature and the subject feature.

* * * * *

UNITED STATES PATENT AND TRADEMARK OFFICE
CERTIFICATE OF CORRECTION

| | | |
|---|---|---|
| PATENT NO. | : 8,538,722 B2 | Page 1 of 1 |
| APPLICATION NO. | : 12/855908 | |
| DATED | : September 17, 2013 | |
| INVENTOR(S) | : Naya | |

It is certified that error appears in the above-identified patent and that said Letters Patent is hereby corrected as shown below:

On the Title Page

On Page 2, Item (56), under "OTHER PUBLICATIONS", in Column 2, Line 4, delete "al" and insert -- al., --, therefor.

On Page 2, Item (56), under "OTHER PUBLICATIONS", in Column 2, Line 7, delete "al" and insert -- al., --, therefor.

In the Specification

In Column 9, Line 1, delete "average vector of" and insert -- average vector $\mu_a$ of --, therefor.

In Column 10, Line 22, delete "support vector machine (SVN)," and insert -- support vector machine (SVM), --, therefor.

In Column 12, Line 50, delete "(step 110)." and insert -- (step S110). --, therefor.

Signed and Sealed this
Twentieth Day of May, 2014

Michelle K. Lee
*Deputy Director of the United States Patent and Trademark Office*